Patented Aug. 10, 1937

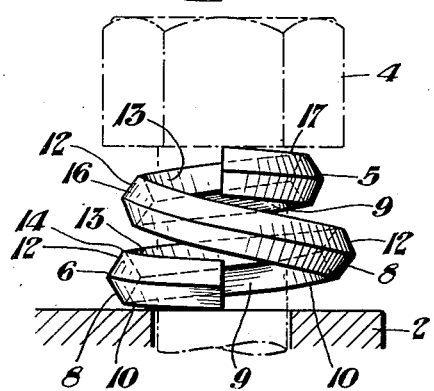
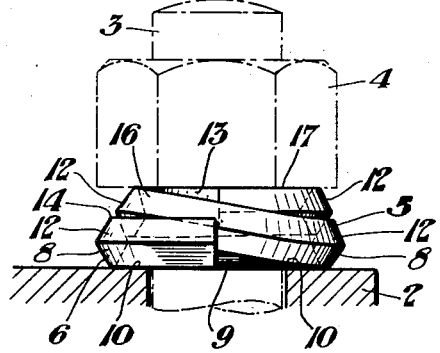
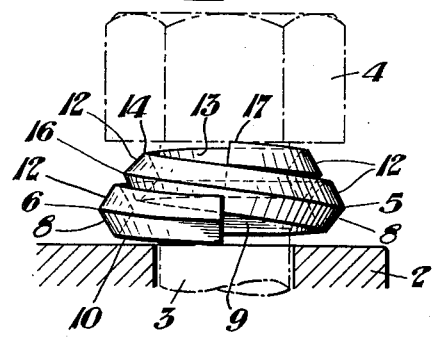
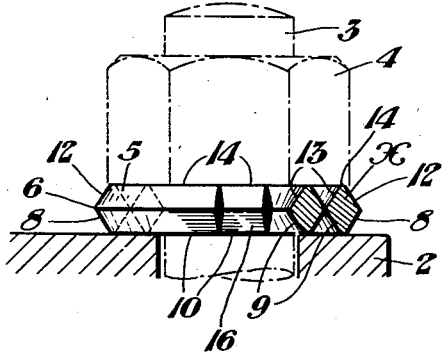
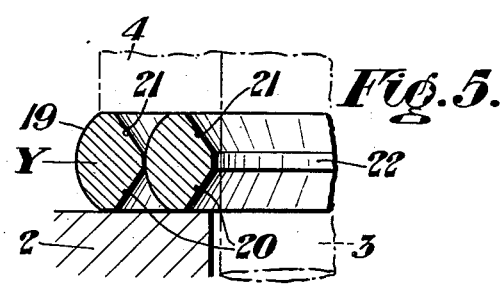
Inventors:
ELMER E. LEGGE and
LEONARD C. PESKIN.

2,089,924

UNITED STATES PATENT OFFICE 2,089,924

COMBINED SPRING WASHER AND NUT LOCK

Elmer E. Legge, Leicester, and Leonard C. Peskin, Worcester, Mass., assignors to The American Steel and Wire Company of New Jersey, a corporation of New Jersey Application June 17, 1935, Serial No. 27,090

3 Claims. (Cl. 151—36)

This invention relates to a combined spring washer and nut lock and one which is particularly adapted to bolt and nut installations which are used on structures that are subjected to frequent and severe vibrations, such as rail fastenings and the like, although not limited thereto.

In the installation of devices used for fastening railroad rails to ties, considerable difficulty has been experienced in maintaining the nuts in tight engagement with the bolts on which they are threaded. There are numerous devices of the prior art which are calculated to overcome these difficulties by exerting a positive spring action on the nut to hold it continuously from revolving and therefore loosening. Such devices are, however, rather inflexible in performance.

Some of the devices of the prior art provide a helical spring which is intended to increase the resistance of the nut to rotation on the bolt by means of compressive forces offered by the forcing into normal helical form crimped portions of the helix.

It is one of the objects of the present invention to provide a novel combined spring washer and nut lock offering pressure on the nut by an increased frictional resistance and internal pressure.

Another object is the provision of a novel combined spring washer and nut lock in the form of a cone which increases the resistance to rotation of the nut with respect to the bolt by compressive forces, causing hoop tension and bending when adjacent coils, or convolutions, are caused to nest one within the other.

A further object is to provide a combined spring washer and nut lock which, when functioning in the latter capacity, exerts a positive spring action on the nut in a circumferential direction, tending to hold it continuously from revolving and is thus particularly adapted for use on structures wherein severe vibrations are encountered.

Another object is to provide a combined spring washer and nut lock which, when functioning in the former capacity by virtue of removal of the whole or part of the locking features, by means of grinding, cutting, forming or other suitable methods, acts as a heavy duty spring, offering great pressure to the nut, and is thus particularly adapted for use on structures where large resistance spring action is desired, with a limited amount of movement.

The foregoing and further objects will be apparent after referring to the drawing, in which:

Figure 1 is a side elevation of the device of the invention as used on a bolt and nut, and prior to its being compressed.

Figure 2 is a view similar to Figure 1 but disclosing the device of the invention as it appears when compressed.

Figure 3 discloses a modified form of the device of the invention prior to its being compressed.

Figure 4 discloses the embodiment of Figure 3 in its compressed position.

Figure 5 discloses a further modification.

Referring more particularly to the drawing, the numeral 2 designates a fragmentary portion of a conventional rail fastening device which forms no part of the present invention, while the numerals 3 and 4 designate a bolt and nut respectively which are intended for use thereon. The device of the invention comprises generally a helio-conical strip or body of metal 5 which is substantially rectangular or elliptical in cross-section, as shown at X in Figures 4 and 5.

In the form of the invention shown in Figure 1 of the drawing the helio-conical strip of metal 5 provides a lower convolution 6 which rests upon the surface of the rail fastening device 2. This lower convolution 6 is constructed in such fashion that the lower converging surfaces 8 and 9 of its sides meet as at 10 and provide a relatively sharp edge or narrow surface which rests upon the top surface of the rail fastening. The upper converging surfaces 12 and 13 of the helio-conical strip 5 meet in a relatively sharp edge or narrow surface 14 immediately above which, and relatively offset from, there is disposed the lower edge 10 of the lower converging surfaces 8 and 9 of the next convolution 16 of the strip 5. In using this form of the invention the nut 4 is tightened on the bolt 3 in such manner as to engage the relatively sharp upper surface 14 of the uppermost convolution of the helio-conical strip which is indicated in the drawing at 17. As the tightening of the nut 4 is continued, the convolution 16 of the helio-conical strip 5 is made to occupy a portion of the convolution 6, while the uppermost convolution 17 occupies a portion of the convolution 16. In this manner, the lower converging surface 8 of each convolution is made to contact with the upper converging surface 13 of the convolution immediately below it, as clearly shown in Figure 2.

In using either of these embodiments, the expansive influence of the compressed helio-conical strip 5 works extremely efficiently in a dual capacity of spring washer and lock nut; even on structures which are subjected to the most severe and frequent vibrations.

Referring to Figure 5, we have disclosed another modification which comprises a strip Y having its outer face defining a curve on a single radius, while its inner surfaces are relatively flat and converge as at 20 and 21. According to this embodiment, the upper and lower edges of the strip Y are substantially flat, together with the inner surfaces of each convolution thereof, as at 22. That is to say, the convergent surfaces 20 and 21 are connected by a straight surface 22 which abuts the curved surface 19 on the outside of its adjacent and inner convolution. The construction of Figure 5 is one which may be somewhat more readily expanded than the construction of Figure 4, assuming all convolutions will lie in the same plane while in a compressed condition; otherwise they function in the same manner.

While we have shown and described several specific embodiments of our invention, it will be understood that we do not wish to be limited exactly thereto, since various modifications may be made without departing from the scope of our invention, as defined by the following claims.

We claim:

1. A combined spring washer and nut lock comprising a helio-conical metallic strip having a plurality of convolutions, said convolutions including upper and lower converging surfaces adapted to provide relatively sharp top and bottom edges, said edges of each convolution being offset with respect to each other to permit the lower converging surfaces of said convolutions to occupy a portion of the upper surfaces of the adjacent convolutions whereby the frictional resistance and internal pressure of said washer is increased to produce hoop tension and bending of said washer when adjacent convolutions are caused to nest one within the other when said washer is compressed.

2. A combined spring washer and nut lock comprising a helio-conical metallic strip having a plurality of superimposed convolutions, said convolutions including upper and lower converging surfaces adapted to provide relatively sharp edges, the top and bottom edges of said convolutions being offset with respect to each other to permit said convolutions to coincide in a single plane and increase the frictional resistance and internal pressure of said washer and to produce hoop tension and bending thereof when compressed.

3. A combined spring washer and nut lock adapted to be positioned between a bearing surface and a nut, comprising a helio-conical metallic strip having a plurality of convolutions, said convolutions including upper and lower converging surfaces provided with relatively sharp edges adapted to engage the nut and bearing surface, said edges being offset with respect to each other to permit the lower converging surfaces of said convolutions to occupy a portion of the upper surfaces of the adjoining convolutions to increase the frictional resistance and internal pressure of said washer and produce hoop tension and bending thereof when said washer is compressed by said nut.

ELMER E. LEGGE.
LEONARD C. PESKIN.